(No Model.)

D. F. McDONALD.
ANIMAL SHEARS.

No. 430,669. Patented June 24, 1890.

WITNESSES:
Wm Kowalski
Wm M Connell

INVENTOR
Duncan F. McDonald
BY A. J. O'Brien
his ATTORNEY

THE NORRIS PETERS CO., PHOTO-LITHO., WASHINGTON, D. C.

UNITED STATES PATENT OFFICE.

DUNCAN F. McDONALD, OF BERKELEY, CALIFORNIA.

ANIMAL-SHEARS.

SPECIFICATION forming part of Letters Patent No. 430,669, dated June 24, 1890.

Application filed September 21, 1889. Serial No. 324,667. (No model.)

*To all whom it may concern:*

Be it known that I, DUNCAN F. MCDONALD, a citizen of the United States, residing at Berkeley, in the county of Alameda and State of California, have invented certain new and useful Improvements in Animal-Shears; and I do declare the following to be a full, clear, and exact description of the invention, such as will enable others skilled in the art to which it appertains to make and use the same, reference being had to the accompanying drawings, and to figures of reference marked thereon, which form a part of this specification.
My invention relates to improvements in sheep-shearing devices; and the object of my invention is to provide a device of the class named, consisting of a circular knife with an exceedingly thin sharp edge, either plain or serrated, said knife being adapted by reason of its constructions and connections to be propelled at a very high rate of speed, a device of simple construction, inexpensive, durable, easily operated, reliable, effective, and at the same time capable of very rapid work, no special skill being required for its successful operation.

To this end my invention consists of the features, arrangements, and combinations hereinafter described and claimed.

Figure 1:
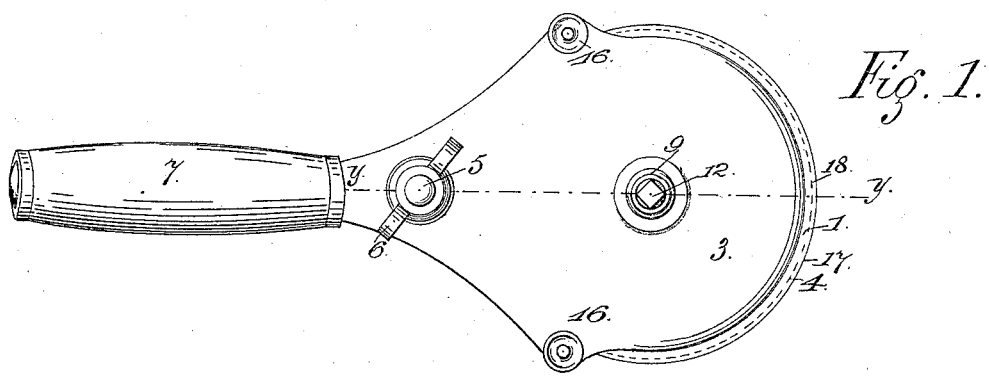
Figure 2:
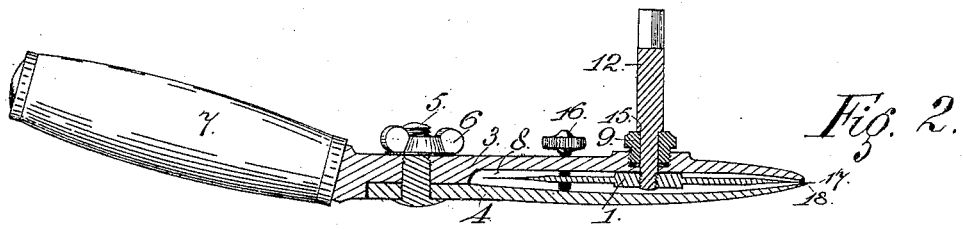
Figure 3:
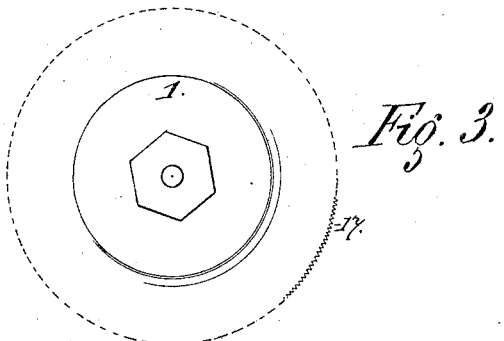

In the drawings is illustrated an embodiment of my invention, in which drawings Figure 1 is a top or plan view of the complete device. Fig. 2 is a view partially in elevation and partially in section, the sectional part being taken on the line *y y*, Fig. 1. Fig. 3 is a top or plan view of the knife with serrated edge, only a small portion, however, of the edge being shown serrated in the drawings, the small serrated portion being intended to indicate the character of the entire periphery.

In the views, let the reference-numeral 1 indicate a circular knife with plain or serrated edge, exceedingly thin and sharp. This knife is supported and revolves between two plates 3 and 4, secured together by a bolt 5, provided with a thumb-screw 6. The forward outline of plates 3 and 4 for a distance equal to a little more than a semi-circumference is circular and parallel with the edge 17 of the knife, which projects beyond the peripheral edges of the plates 3 and 4, as shown.

The peripheral edge of plate 4 or the lower plate when the device is in use extends somewhat nearer the edge of the knife than the corresponding edge of the upper plate 3. The object of this is to avoid liability of cutting the skin of the animal while shearing off the wool. This extension of plate 4 beyond plate 3 is indicated by dotted line 18 in Fig. 1.

Plate 3 is secured to a suitable handle 7. This plate is cut away near the handle and fashioned to receive the rear portion of plate 4, where the plates are securely joined together by bolt 5 and its thumb-screw heretofore mentioned.

There is sufficient space between plates 3 and 4 to allow room for the knife to work freely. This space is formed chiefly by cutting away plate 3 so as to leave a considerable space 8 between the plates just forward of where they are joined by the bolt and thumb-screw.

Plates 3 and 4 when in their normal condition are nearly or quite in contact at their peripheral edges.

The knife is secured at its center to one extremity of a small shaft 12, which passes through a suitable aperture in plate 3 and is suitably journaled within the plate, being surrounded by a stationary adjustable journal-box 9, screwed into the top of the plate. Shaft 12 is provided with a suitable shoulder 15, which is always in contact with the top of box 9. This box does not extend through plate 3.

The central portion of knife 1, surrounding the aperture for shaft 12, should always be in suitable contact with plate 3 beneath box 9. These contact-points of the knife and plate should be nicely and closely fitted together in order that the rotation of the knife may be steady and true. The closeness of the contact of these parts is regulated by adjusting the journal-box or nut 9 within its recess or socket in the top of plate 3.

Plate 3 is provided with two small screws 16 16, extending through the plate outside of the edge of the knife, their inner extremities being in contact with the inner surface of plate 4. The space between plates 3 and 4 is regulated by means of these screws, which, by pressing against plate 4, spring the plates apart to any distance desired.

The means (shown in the drawings and herein set forth) for supporting and adjusting the knife are only a type of means which might be employed for this purpose; hence I do not wish to limit myself to this construction.

Any suitable power may be employed for propelling the knife, and this power may be applied through any means desired.

In the use of my improved device the power is applied to the shaft 12 and the knife made to rotate with great velocity, say at the rate of from three to five thousand revolutions per minute.

The device is held and guided with one hand, while the wool is pressed against the edge of the knife with the other hand.

Though my improvement is more especially designed for sheep-shearing, it may also be used in clipping horses and for all similar purposes.

Having thus described my invention, what I claim is—

The combination, with two plates 3 and 4, provided with a knife-space between them, the plates being secured together in the rear of the knife-space, of a circular rotating knife with plain or serrated edge and adjustable journal-box 9, having a threaded exterior and a smooth or plain central aperture, plate 3 being provided with a threaded recess or socket for the reception of box 9, and a motor-shaft 12, passing through the aperture in box 9 and secured to the center of the knife, shaft 12 being provided with a shoulder 15, resting on top of box 9, one or more screws 16 passing through plate 2 outside of the knife-edge and adapted to regulate the size of the knife-space between plates 3 and 4, substantially as described.

In testimony whereof I affix my signature in presence of two witnesses.

DUNCAN F. McDONALD.

Witnesses:
R. J. VAN VALKENBURG,
S. BARNHILL.